455/3

TIME DIVISION MULTIPLEX TELEPHONE CIRCUITRY FOR PROVIDING RAPID TRANSFER OF A CALL FROM ONE CALLED PARTY TO ANOTHER

Filed June 6, 1960 4 Sheets-Sheet 1

INVENTOR.
WILLIAM F. BARTLETT
BY Robert Nathans
ATTORNEY

Nov. 24, 1964 W. F. BARTLETT 3,158,688

TIME DIVISION MULTIPLEX TELEPHONE CIRCUITRY FOR PROVIDING RAPID TRANSFER OF A CALL FROM ONE CALLED PARTY TO ANOTHER

Filed June 6, 1960 4 Sheets-Sheet 3

LINE TIME SLOT STORE 16 OF PARTY B

Nov. 24, 1964 W. F. BARTLETT 3,158,688

TIME DIVISION MULTIPLEX TELEPHONE CIRCUITRY FOR PROVIDING RAPID TRANSFER OF A CALL FROM ONE CALLED PARTY TO ANOTHER

Filed June 6, 1960 4 Sheets-Sheet 4

LINE TIME SLOT STORE 18 OF PARTY C

United States Patent Office 3,158,688
Patented Nov. 24, 1964

3,158,688

TIME DIVISION MULTIPLEX TELEPHONE CIRCUITRY FOR PROVIDING RAPID TRANSFER OF A CALL FROM ONE CALLED PARTY TO ANOTHER

William F. Bartlett, Rochester, N.Y., assignor to General Dynamics Corporation, Rochester, N.Y., a corporation of Delaware Filed June 6, 1960, Ser. No. 34,041
10 Claims. (Cl. 179—15)

Figure 1:
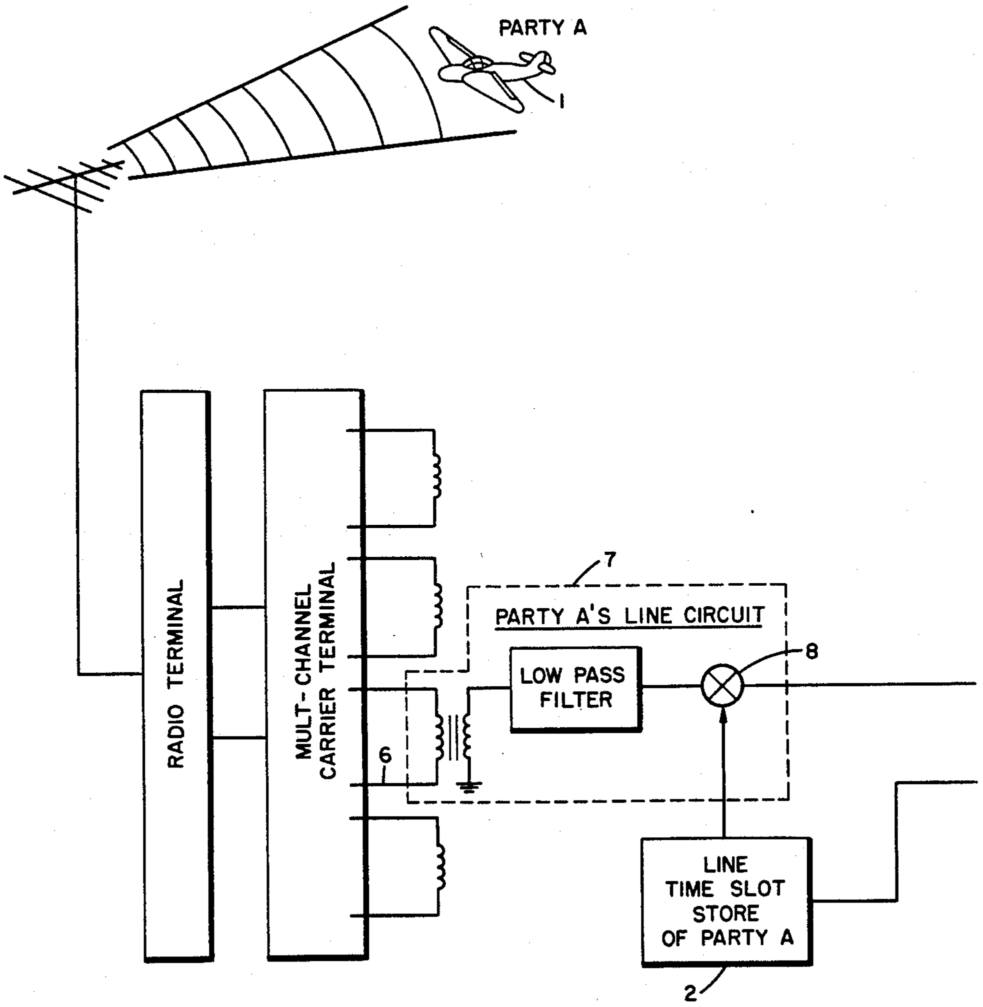

The present invention relates to call transfer circuitry utilized in a time division multiplex telephone system.

It is often desirable after a call has been set up between a calling party and a first called party to transfer the call to a second called party while at the same time releasing the first called party, if desired, and without having the calling party retransmit directive information to establish the connection with the second called party. For instance, when a plane is about to land on an aircraft carrier, the pilot transmits directive information to set up a call between himself and the flight deck officer who gives him landing instructions. A short time later, it is desirable that the pilot communicate with the storage deck officer without having to retransmit directive information to set up the new connection, since this process takes time and requires additional equipment. Similarly, a locomotive engineer entering a yard employing time division multiplex telephone circuitry might want to communicate with a number of people successively and it is advantageous that the first called party in the yard be able to rapidly transfer the call to a second called party without requiring the engineer to retransmit directive information to set up this latter connection. This type of operation may be extended so that an executive receiving numerous trunk calls can switch an incoming call selectively to one or more of his lieutenants without having to resignal the operator to have her reestablish this connection.

Accordingly, it is a principal object of the present invention to provide a fixed party transfer circuit for a time division multiplex telephone system.

It is a further object of the present invention to provide circuitry in a time division multiplex telephone system which is under the control of a first called party for selectively switching an incoming call to one or more of a number of parties, with or without releasing the first called party, and without having to resignal an operator to set up these connections, and without having the calling party transmit any further directive information.

It is a feature of the present invention to provide a plurality of transfer keys which control gates to selectively transfer a time slot circulating in a first called party's time slot store into one or more time slot stores associated with other parties who are to be connected to the calling party.

It is a further feature of the present invention to provide a hold key along with the transfer keys so as to prevent the release of the first called party transferring the call if he so desires.

It is yet a further feature of the present invention to provide signaling means responsive to the operation of the transfer circuitry to notify transferees that the transfer is being made so that they may pick up their handsets.

Figure 2:
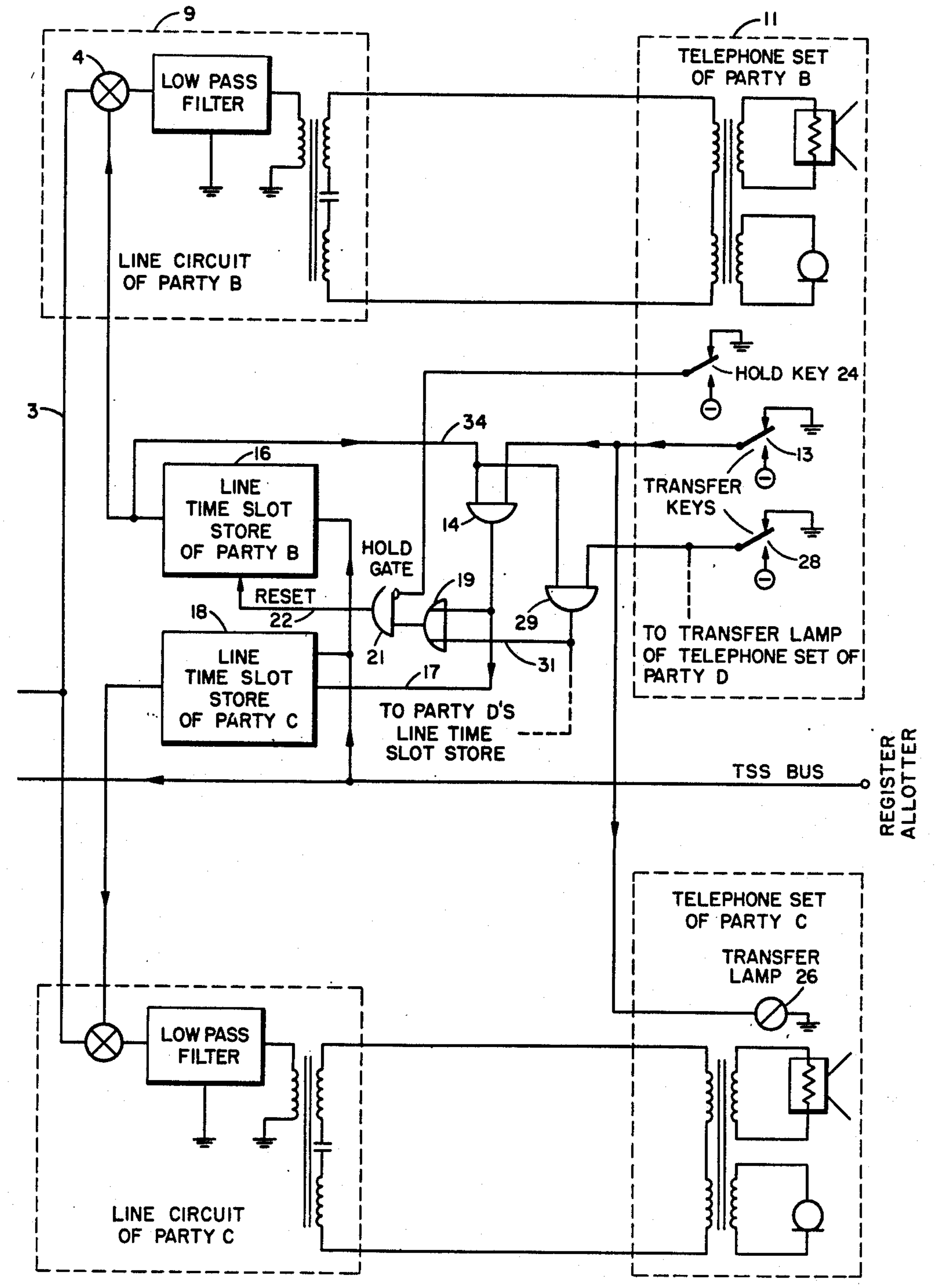
Figure 3:
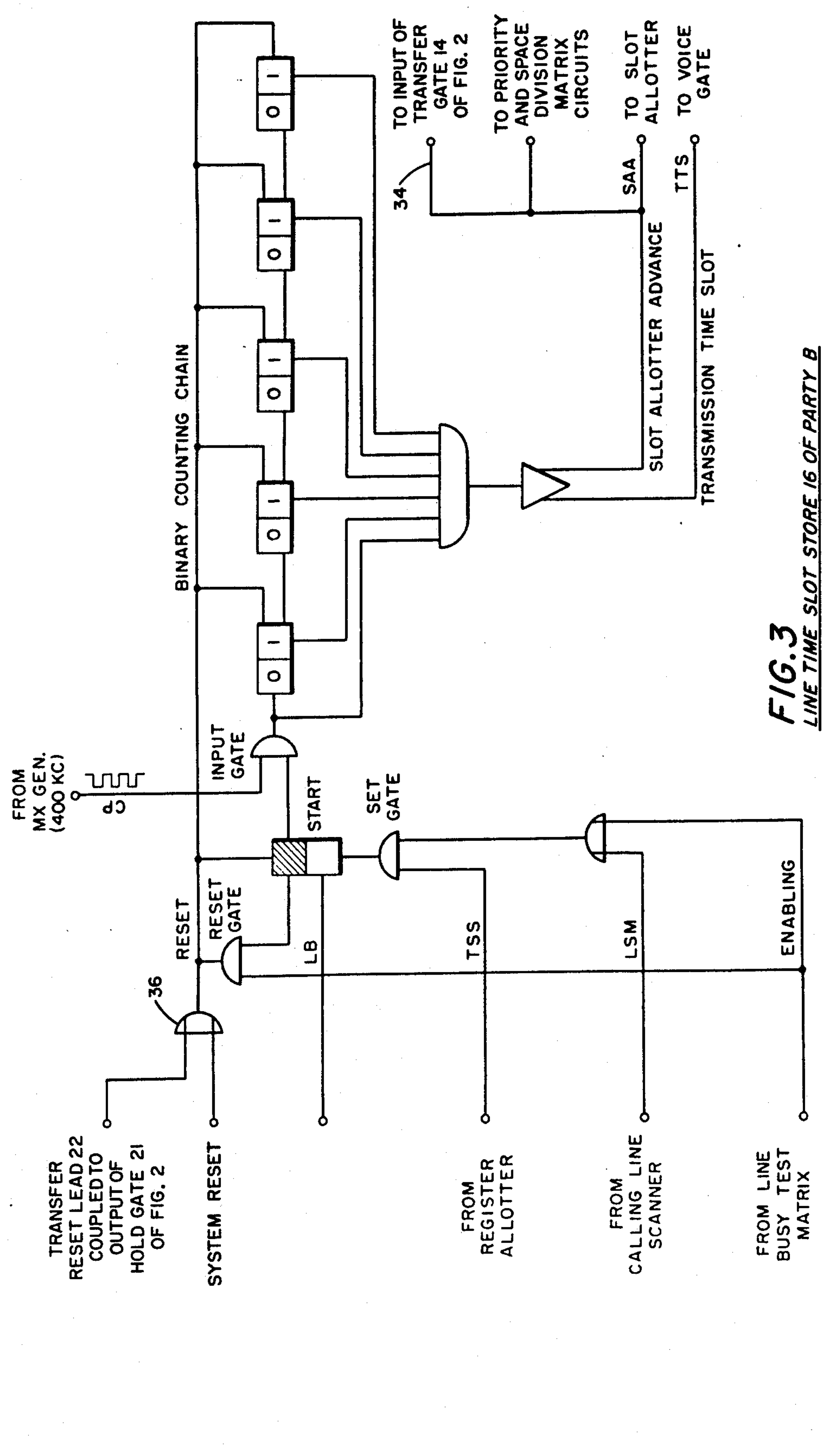

For a better understanding of the present invention, together with further objects, advantages and features thereof, reference is made to the following description and accompanying drawings, in which:

FIGS. 1 and 2 disclose the overall system,

FIG. 3 discloses the line time slot store of party B, and

Figure 4:
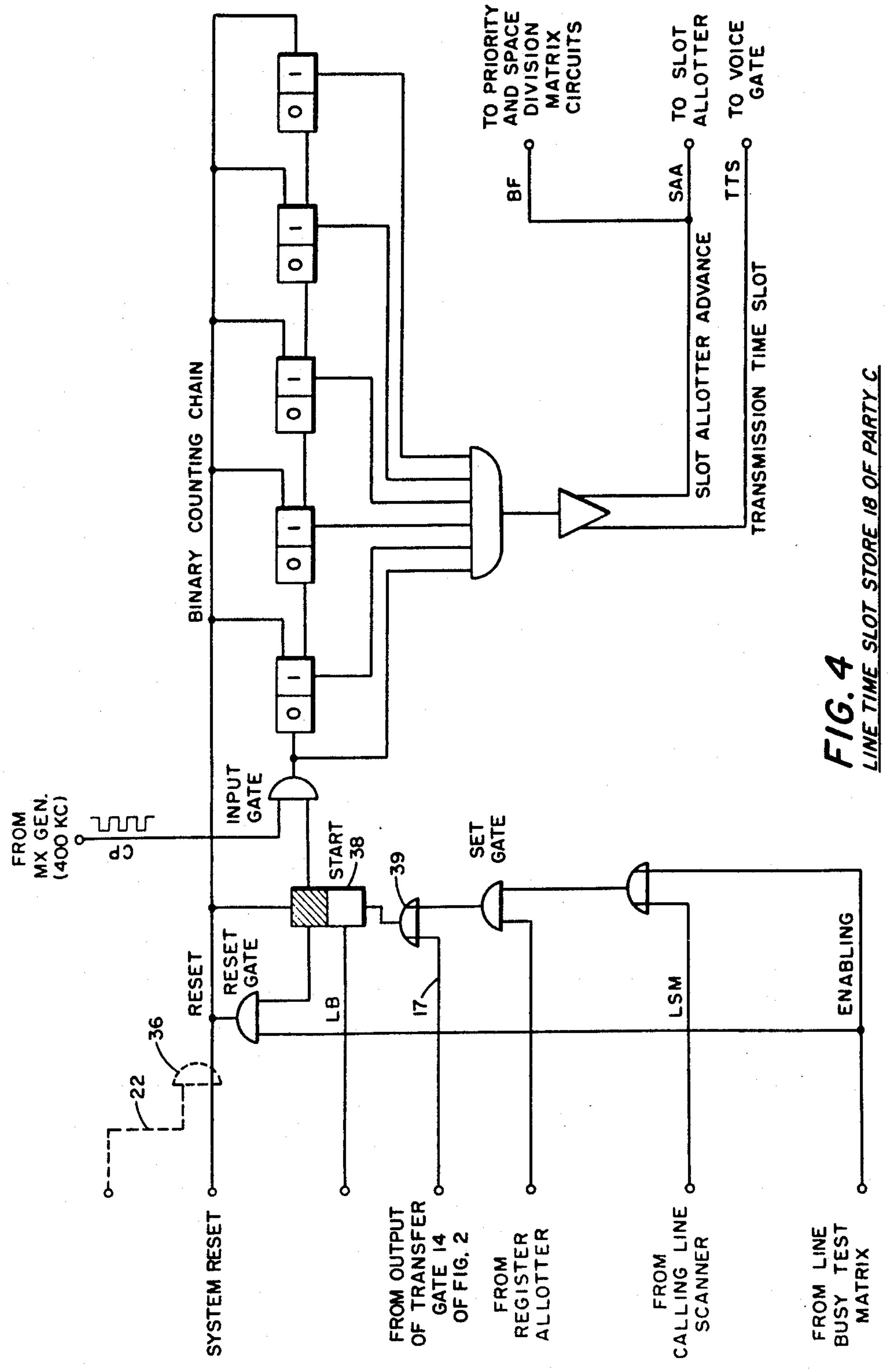

FIG. 4 discloses the line time slot store of party C.

FIGS. 1 and 2 disclose part of the circuitry which is disclosed and described in detail in the patent application of Theodor Frankel and William H. Black, Serial No. 29,037 filed May 13, 1960 and assigned to the same assignee as the present invention or the patent application of William F. Bartlett and James D. Ross, Serial No. 27,888 filed May 9, 1960 and now Patent No. 3,066,192 and assigned to the same assignee as the present invention, and in addition discloses the circuitry of the present invention. It should be understood that the aforementioned patent applications are incorporated by reference in the present patent application so that the system of FIGS. 1 and 2 is complete.

Party A, as represented by the aircraft 1 disclosed in FIG. 1, transmits directive information thereby to cause a time slot to be inserted into line time slot store 2 of FIG. 1 so as to couple party A's line circuit 7 to the common transmission channel 3 during a particular time slot during each transmission frame. At this time, this time slot is also inserted into line time slot store 16 of party B so that the line circuit of party B is coupled to common transmission channel 3 through gate 4. This process is explained in detail in the aforementioned copending patent applications and since it forms no part of the present invention, it will not be explained herein. The pilot now is in communication with party B, who in one particular application of the invention may be a flight deck officer. This path may be traced through channel 6, party A's line circuit 7, line gate 8, common transmission channel 3, voice gate 4, party B's line circuit 9, and party B's telephone set 11. After party B has guided the pilot, as represented by party A, into position, it is desirable that party A be immediately placed in touch with party C, who in this particular application, may be the storage deck officer. In order to carry out this process, party B operates transfer key 13 thereby to momentarily enable transfer gate 14 so as to cause the time slot circulating in line time slot store 16 of party B to be forwarded through transfer gate 14 to input lead 17 of line time slot store 18 of party C. A mark is also forwarded through OR gate 19 and hold gate 21, which is enabled at this time, to reset lead 22 of party B's line time slot store 16. Accordingly, when party B operates transfer key 13, the time slot is transferred from time slot store 16 of party B into time slot store 18 of party C and the time slot circulating in party B's line time slot store is erased since time slot store 16 is reset.

In the event that party B desires to transfer the time slot circulating in party B's time slot store 16 into time slot store 18 of party C and at the same time wishes to remain in contact with party A, hold key 24 is also operated so that hold gate 21 is inhibited thereby to prevent the reset mark, passing through OR gate 19, from resetting line time slot store 16. The operation of transfer key 13 also causes transfer lamp 26, which is situated within the telephone set of party C, to become operated thereby to inform party C that he is to answer the call.

If desired, the call may be transferred to two transferees represented by party C and party D. This process would require that transfer key 13 and transfer key 28 be actuated so that both AND gates 14 and 29 are enabled, thereby to forward the time slot circulating in time slot store 16 of party B to the time slot stores of parties C and D. Of course, the operation of transfer key 28 alone would merely transfer the call to party D only. This action would cause resetting of the time slot store 16 as in the case of the operation of transfer key 13 due to the presence of lead 31. It should be obvious that the arrangement may be expanded to transfer the incoming call to any number of transferees or any combination of them by merely providing the appropriate key arrangement. For example, the actuation of one transfer key might conceivably connect three or four particular transferees to the calling party. The required matrix arrangement is not shown since its construction is patently obvious to those skilled in the art. It should also be understood that hold key 24 be of any type well known in the art which remains operated for a substantial period of time. If this were not the case, the successive operation of two or three transfer keys might cause a resetting of line time slot store 16 although such was not intended. If desired, the release of hold key 24 could be under the control of party B.

FIG. 3 discloses in detail line time slot store 16. Both FIGS. 3 and 4 are almost identical with the time slot stores disclosed in the aforementioned copending applications. FIG. 3 discloses an output lead 34 which is coupled to the input circuit of transfer gate 14. This lead merely provides for the forwarding of the time slot to transfer gate 14. Reset lead 22 of FIG. 2 is connected to OR gate 36 of FIG. 3 and it should be obvious that the presence of a mark on reset lead 22 will pass through OR gate 36 thereby to reset the line time slot store 16. This lead is coupled to the output circuit of hold gate 21 of FIG. 2. For further details of the operation of the line time slot stores of FIG. 3 and FIG. 4, reference may be had to the aforementioned copending applications.

The line time slot store of FIG. 4 includes output lead 17 of transfer gate 14 which is coupled to the set terminal of start flip-flop 38 through OR gate 39. The presence of a mark on lead 17 causes the insertion of a time slot in the line time slot store of FIG. 4. Again, for further details of the operation of FIG. 4, reference may be had to the aforementioned copending applications since these details form no part of the present invention.

It should be obvious that party A may successively be placed in contact with any number of called parties. If it is desired that party C transfer the call to party D, it should be obvious that FIG. 4 may be modified to provide an OR gate similar to OR gate 36 in the line time slot store of FIG. 3 so that the line time slot store of party C may become reset upon the transfer of the call to party D. Of course, the hold circuitry and a plurailty of transfer keys may be provided in any number of telephone sets, as desired.

In summary, the present invention provides means for rapidly transferring a call selectively from a first called party to one or more transferees, with or without releasing the first called party, and without having the calling party transmit further directive information. The transferees may become transferors, in turn, to connect the calling party to a number of called parties sequentially.

While there has been disclosed what is at present considered to be the preferred embodiment of the invention, other modifications will readily occur to those skilled in the art. It is not therefore desired that the invention be limited to the specific arrangement shown and described and it is intended in the appended claims to cover all such modifications as fall within the true spirit and scope of the invention.

What is claimed is:

1. In a time division multiplex telephone system, first, second, and third line circuits, a common transmission channel, first, second, and third gates for coupling said first, second, and third line circuits respectively to said common transmission channel, first, second, and third time slot stores for enabling an associated one of said gates, means for inserting information representing the same time slot into said first and second time slot stores so as to couple said first line circuit to said second line circuit, means for transferring said information in said second time slot store into said third time slot store, and means responsive to the operation of said means for transferring for clearing said second time slot store.

2. The combination as set forth in claim 1 further including means for at times inhibiting the operation of said means for clearing.

3. The combination as set forth in claim 1 wherein said means for transferring includes a gate and further includes means for enabling said gate to facilitate transfer.

4. The combination as set forth in claim 1 having means responsive to the operation of said means for transferring for giving an indication that the transfer is being made.

5. In a time division multiplex telephone system, first, second, third, and fourth line circuits, a common transmission channel, first, second, third, and fourth gates for coupling said first, second, third and fourth line circuits to said common transmission channel, first, second, third, and fourth time slot stores for enabling an associated one of said gates, means for inserting information representing the same time slot into said first and second time slot stores so as to couple said first line circuit to said second line circuit, means for transferring said information in said second time slot store selectively into said third time slot store or said fourth time slot store, and means responsive to the operation of said means for transferring for clearing said second time slot store thereby to cause said second line circuit to become decoupled from said first line circuit and to cause either said third line circuit or said fourth line circuit to be coupled to said first line circuit.

6. The combination as set forth in claim 5 wherein said means for transferring includes a first and second AND gate, each having a first input terminal coupled to the output circuit of said first line time slot store and a second input terminal coupled to an associated key.

7. The combination as set forth in claim 5 wherein means are provided for giving an indication that transfer has been made.

8. The combination as set forth in claim 5 further including means for at times inhibiting the operation of said means for clearing.

9. In a time division multiplex telephone system, a first time slot store, a second time slot store, means for inserting information representing a time slot into said first time slot store, means for transferring said information from said first time slot store into said second time slot store, means controlled by the operation of said means for transferring for causing said information to be erased from said first time slot store, and means for disenabling at times said means for causing said information to be erased so as to prevent information from being erased in said first time slot store upon transfer to said second time slot store.

10. In a time division multiplex telephone system, a first, second and third time slot store, means for inserting information representing a time slot into said first time slot store, means for transferring said information selectively into said second time slot store or said third time slot store, means controlled by the operation of said means for transferring for causing said information to be erased from said first time slot store, and means for disenabling at times said means for causing said information to be erased so as to prevent information from being erased in said first time slot store upon transfer to either said second time slot store or said third time slot store.

References Cited in the file of this patent

UNITED STATES PATENTS

| | | |
|---|---|---|
| 2,635,233 | Homrighous | Apr. 14, 1953 |
| 2,729,812 | Jahn | Jan. 3, 1956 |
| 2,803,812 | Rajchman | Aug. 20, 1957 |
| 2,917,583 | Burton et al. | Dec. 15, 1959 |